United States Patent

Eichacker

[15] 3,693,462
[45] Sept. 26, 1972

[54] TORQUELESS TRANSMISSION
[72] Inventor: Harold F. Eichacker, 23 Churchill Road, Wethersfield, Conn. 06109
[22] Filed: June 28, 1971
[21] Appl. No.: 157,552

[52] U.S. Cl. ................................................74/25
[51] Int. Cl. ..........................................F16h 21/16
[58] Field of Search ............222/14; 74/25, 568, 459

[56] References Cited

UNITED STATES PATENTS

| | | | |
|---|---|---|---|
| 1,487,702 | 3/1924 | McBarh | 74/25 |
| 1,346,625 | 7/1920 | Woodward, Jr. | 74/25 |
| 1,938,459 | 12/1933 | Neilly | 74/25 |
| 2,405,589 | 8/1946 | Marsh et al. | 222/14 |
| 2,882,742 | 4/1959 | Conant | 74/459 |
| 3,151,500 | 10/1964 | Krug | 74/568 |

Primary Examiner—William F. O'Dea
Assistant Examiner—Wesley S. Ratliff, Jr.

[57] ABSTRACT

Apparatus for mechanically converting the movement of a driven member into usable mechanical output signals without imposing any significant loading on the driven member. The driven member is modified as necessary to permit it to roll a lightweight bearing element between a pair of apertures and the bearing element will pass through the second of said apertures and be picked up by a power drive unit which includes means for sensing the presence of the bearing element as it is driven back to the vicinity of the first aperture through which it is returned so as to again be intercepted by the driven member.

15 Claims, 7 Drawing Figures

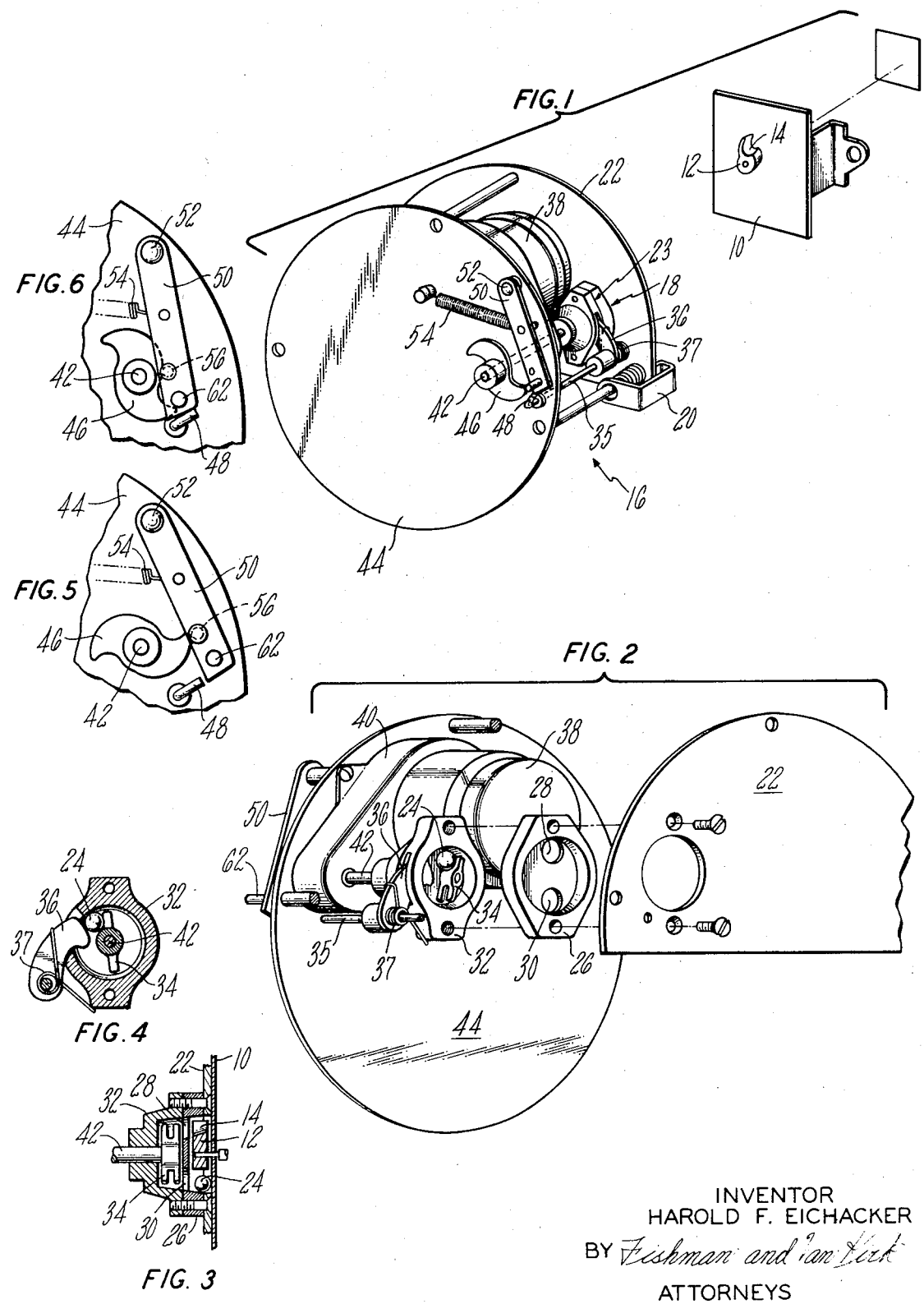

TORQUELESS TRANSMISSION

BACKGROUND OF THE INVENTION:

1. Field of the Invention

The present invention relates to the sensing of movement of a driven element for the purpose of generating output signals commensurate with such movement. More specifically, the present invention is directed to apparatus for mechanically generating output signals commensurate with rotation of an input shaft without imposing any significant mechanical loading on the input shaft. Accordingly, the general objects of the present invention are to provide novel and improved methods and apparatus of such character.

2. Description of the Prior Art

While not limited thereto in its utility, the present invention is particularly well suited for use in association with instruments used to measure various quantities. Precision measuring instruments, including laboratory instruments and those employed in the field by utilities and other users, typically have little torque available for driving equipment which may be coupled to the instrument for purposes such as remote read out. The ability to sense the state of a standard measuring instrument, either continuously or periodically, from a remote location thus obviating the need for a technician to monitor or periodically check the instrument is often desired.

Previous attempts at coupling a read out device to a standard meter movement have met with only limited success. These previous attempts have included optical sensing of movements of the dials of the standard instrument. Due to lack of reliability of the components employed in such optical sensing systems, optical techniques have not met with acceptance. Attempts have also been made at mechanically sensing output dial movements of a standard measuring instrument. While mechanical techniques are generally favored due to their reliability and low initial cost, as a consequence of the extremely limited torque available for powering devices which might be coupled to the measuring instruments, previous mechanical techniques have been characterized by inaccuracy and damage to the lightweight, fragile gear trains employed to drive the pointers on the various instrument dials.

SUMMARY OF THE INVENTION

The present invention overcomes the above briefly discussed and other deficiencies of the prior art by providing a novel and improved transmission unit which generates, from a mechanical input, a mechanical output signal in usable form without imposing any undesirable torque requirements on the device which provides the input signal. In accordance with the present invention, a motion transmission unit is coupled to a rotating input shaft by a lightweight bearing element. The bearing element will be moved between two positions, rolling freely and without friction in the course of such movement, with the aid of a lightweight rotor which is attached to the input shaft. When driven in frictionless fashion to a first limit of movement or position by the rotor, the bearing element will drop into engagement with a power driven impeller which will return the bearing element to a second position where it may again be picked up by the rotor. As the bearing element moves under the influence of the impeller, its presence will be sensed by a pivotal member which is caused to move by force transmitted thereto from the impeller via the bearing element. Movements of the pivotal member are converted, by a power drive unit, to a mechanical output pulse commensurate with each complete revolution of the input shaft.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is an exploded, front perspective view of a preferred embodiment of the present invention;

FIG. 2 is an exploded, rear perspective view of the embodiment of FIG. 1;

FIG. 3 is a cross-sectional, side elevation view of the motion transmission assembly of the apparatus shown in FIGS. 1 and 2;

FIG. 4 is a cross-sectional view, taken along 4—4, of the motion transmission unit of FIG. 3;

FIGS. 5 and 6 are partial front views of the preferred embodiment of FIG. 1 depicting the output member of the power drive portion of the disclosed embodiment in two positions.

DESCRIPTION OF THE PREFERRED EMBODIMENT

Figure 7:
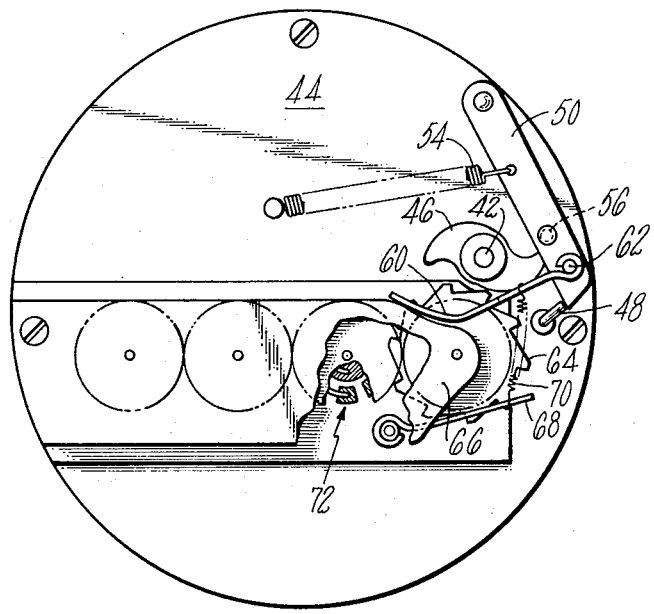
FIG. 7 is a front view, partially in section, of an output register which may be employed with the present invention.

With reference now to FIG. 1, a face plate of a standard measuring instrument is indicated at 10. The instrument with which plate 10 is associated will typically be provided with one or more driven output shafts. Face plate 10 may, for example, be a portion of an instrument employed to measure consumption of a quantity such as water, gas or electric power. Instruments presently used to measure consumption, and particularly those employed by utility companies, are highly accurate and sophisticated mechanical or electromechanical devices designed to operate with minimum power absorption for driving the movement of the instrument. In order to minimize friction it is standard practice to employ a rather lightweight, fragile gear train to drive the pointers on the various instrument dials. This fragile gear train, of course, requires little driving torque and thus there is correspondingly little torque available for powering devices which might be coupled to the instrument in order to provide for periodic and/or remote sensing of the state of the instrument.

In accordance with the present invention, a rotor 12 is attached to an output shaft which extends through plate 10. Rotor 12 will typically be fabricated from a lightweight material, for example molded plastic, and will be affixed by any suitable method to the end of the instrument output shaft. Rotor 12 has a substantially arcuate shape and is provided with a pocket 14 having the general shape of a sector of a sphere. The defining wall of pocket 14 is thus inclined, for the purposes to be described below, so as to direct a spherical object resting against rotor 12 in a direction which is both toward the axis about which the pointer rotates and also away from plate 10.

The present invention also comprises a power drive unit indicated generally at 16. The power drive unit 16 includes a motion transmission unit indicated generally at 18 in FIG. 1. The structure and operation of transmission unit 18 may be better understood from a joint consideration of FIGS. 2—4 and will be described below. The power drive unit 16 may be mounted, for example by means of spring loaded clamps such as clamp 20, from the plate 10.

Referring now simultaneously to FIGS. 2-4, the transmission unit 18 of the present invention comprises, in addition to the rotor 12, a housing, indicated generally at 23, which defines inner and outer races for a spherical member 24. In a preferred embodiment of the invention, member 24 comprises a small glass ball. The outer race defining portion 26 of the housing 23 has a frustoconical recess which is in open communication with the face of plate 10. When traveling in the outer race formed by the recess in housing portion 26, the ball 24 will be picked up by rotor 12 and partially carried in pocket 14. The ball will thus travel, in an essentially frictionless manner, by rolling freely against the sloped side wall of the recess and also on the bottom of the recess and the surface of plate 10.

The bottom of the recess in outer race defining portion 26 of housing 23 is provided with a pair of oppositely disposed holes 28 and 30 which are slightly larger in diameter than the ball 24. These holes provide communication between the inner and outer races; the inner race being defined by a frustoconical recess in a second portion 32 of housing 23. The inclination and relationship of the walls of the recesses in portions 26 and 32 may best be seen from FIG. 3 and it will be noted that the recess in housing portion 32 defines a section of the same cone as forms the recess in portion 26. The reasons for the inclination of the walls of the recesses in housing defining portions 26 and 32 will become obvious from the description of operation of the invention to be set forth below.

Unlike the outer race defining portion 26 of housing 23, which is provided with holes 28 and 30, the bottom of the frustoconical recess in inner race defining portion 32 is continuous. An impeller member 34 is positioned for rotation within the recess in housing portion 32; the axis of rotation of impeller 34 being aligned with the axis of rotation of the rotor 12. In accordance with the invention there is no mechanical connection between impeller 34 and rotor 12. As may best be seen from joint consideration of FIGS. 2 and 3, and for reasons which will be apparent from the description to follow, the impeller 34 includes a pair of oppositely extending blades of split construction. As may best be seen from FIG. 4, the portion of impeller 34 adjacent the axis of rotation is of enlarged cross-sectional area. The above-described impeller construction results in ball 24 being retained adjacent to or against the side wall of the inner race defining recess when it is being moved under the influence of the impeller as shown in FIG. 4.

As may be seen from FIGS. 2 and 4, the side wall of the inner race defining recess in housing portion 32 is provided with a slot. A trip arm 36 extends through this slot and presents a cam surface to ball 24 internally of the inner race. Trip arm 36 is mounted on a shaft 35 and pivots therewith. It will be noted that the positioning of the slot and the configuration of the trip arm 36 are such that the arm will be cleared by impeller 34; the spacing between the fingers of each split impeller blade providing the requisite clearance for movement of the impeller blades past the trip arm. Accordingly, force will be transmitted to trip arm 36 only when the ball 24 is moved about the inner race under the influence of impeller 34. The trip arm 36 is spring loaded into the position shown in FIG. 4 by spring 37 and will thus return to this position each time it is cammed out of the inner race by contact with the driven ball 24.

The means for driving impeller 34 comprises a small electric motor 38, a gear train 40 and a drive shaft 42. The drive shaft 42, as best shown in FIG. 3, extends through the wall which defines the bottom of the recess in housing portion 32 and impeller 34 will be suitably attached to a first end of shaft 42. The motor 38 drives the impeller constantly at a preselected speed.

Referring again to FIG. 1, it is to be observed that the end of drive shaft 42 opposite to that which is connected to impeller 34 extends outwardly through the front plate 44 of power drive unit 16. A two lobe cam 46 is attached to this second end of shaft 42 adjacent the outwardly disposed surface of plate 44. The shaft 35 which pivots with cam 36 also extends through plate 44 and is then bent transversely of the main portion of the shaft to form a stop arm 48 external of plate 44. Stop arm 48 will pivot, in the clockwise direction considering the disclosed embodiment, each time the cam member 36 is driven out of the inner race by ball 24.

A register trip arm 50 is mounted from the external surface of front plate 44. Arm 50 rotates, in a plane parallel to the surface of plate 44, about a pivot 52 and is spring loaded downwardly and toward the center of plate 44 by means of a spring 54. An inwardly extending projection 56 is provided intermediate the length of arm 50. As may be seen from joint consideration of FIGS. 1, 5 and 6, the length of pivot 52 results in arm 50 being disposed outwardly from plate 44 with respect to cam 46. Accordingly, cam 46 will not contact arm 50 during rotation. The free end of arm 50 will normally be supported, as shown in FIG. 1, by the end of stop arm 48. As cam 46 rotates, the two oppositely disposed lobes thereof will contact inwardly extending projection 56 on arm 50 thus raising the arm 50 off of stop arm 48 as shown in FIG. 5. However, when the cam lobes clear projection 56, the arm 50 will fall off of cam 46 and will be returned under the influence of spring 54 to the position of support on stop arm 48. When stop arm 48 is momentarily rotated in the clockwise direction, however, arm 50 will move under the influence of spring 54 to the position shown in FIG. 6. The continuously rotating cam 46 will, of course, raise the arm 50 back up to the position shown in FIG. 5 during the next half-revolution and, presuming that stop arm 48 has returned to its initial position, arm 50 will again fall off of cam 46 and be supported on stop arm 48.

Before discussing means for coupling the invention to an output register or storage device, it is believed appropriate to discuss the operation of the above-described power drive and transmission system. The ball 24 will initially be in the outer race defined by the frustoconical recess in housing portion 26. The ball will be moved in the outer race by the rotor 12; the ball being picked up by rotor 12 adjacent the lower hole 30 in the base of the recess in housing portion 26. The ball 24 will be raised, the movement of the ball by rotor 12 being in essentially frictionless fashion, to the vicinity of the upper hole 28. The configuration of the pocket 14 on rotor 12 and the inclination of the side wall of the outer race will cause ball 24 to pass through hole 28 and into the inner race defined by housing portion 32. In the inner race the ball will be picked up by one of the split blades of impeller 34 and will be forced against the cam surface on the end of arm 36. Arm 36 will accordingly be caused to pivot out of the inner race as a result of the force imparted thereto by the driven impeller 34 via ball 24. As described above, the pivoting of arm 36 out of the inner race will cause the stop arm 48 to rotate clockwise thus permitting arm 50 to drop downwardly under the influence of spring 54. As previously noted, the impeller 34 and the two lobe cam 46 will be continuously rotating in synchronism and the cam 46 will engage the projection 56 on arm 50 and again raise the arm. When the ball 24 has been driven past arm 36 by impeller 34, the arm will move back into the inner race under the influence of spring 37 and thus the stop arm 48 will return to its original position. Accordingly, when arm 50 falls off one of the lobes on cam 46 it will be caught and retained in the raised position by stop arm 48.

When it clears arm 36, ball 24 will roll to the bottom of the inner race and, due to the configuration of the cooperating frustoconical inner and outer race defining recesses, the ball will pass through hole 30 and into resting abutment with the front surface of plate 10. The relative speeds of rotation of impeller 34 and rotor 12 are such that the ball will be returned to the outer race well in advance of rotor 12 reaching the position where it will again pick up the ball. The ball 24 will be picked up by the rotor 12 during its next revolution and will be again carried to the vicinity of hole 28 thus repeating the cycle.

Considering now FIG. 7, one embodiment of means for coupling the motion of register trip arm 50 to a recording or storage device is shown. A drive arm 60, which functions as a pawl, is pivotally mounted from a projection 62 on arm 50. Drive arm 60 has an inwardly extending shoulder which will engage the teeth on a ratchet wheel or gear 64. The outer end of drive arm 60 will ride on a guide member 66 and the drive arm 60 will be resiliently coupled to a brake arm 68 by means of a spring 70. The brake arm 68 will be provided with an inwardly extending cam surface and adjoining shoulder which will prevent clockwise rotation of gear 64.

Each time the arm 50 is pulled down by spring 54, drive arm 60 will move along the surface of guide member 66 and the inwardly extending shoulder thereon will contact a first tooth on gear 64 thus advancing the gear one step in the counterclockwise direction. When arm 50 is raised back to its initial position by cam 46, the free end of arm 60 will be returned to the position where the shoulder thereon will engage the next succeeding tooth on gear 64. During movement of drive arm 60 to the right as shown in FIG. 7, brake arm 68 will prevent clockwise rotation of gear 64.

Gear 64 may, in a manner well known in the art, be coupled to a plurality of succeeding gears thus providing a train commensurate with a counter having the desired number of digits. If desired, each digit or gear of the counter may be provided with a printed circuit and a plurality of wiper arms may be driven in stepwise fashion from contact to contact on these plural printed circuits commensurate with the stepping of gear 64. By providing the printed circuits, such as the circuit partially shown at 72, with appropriately scaled voltages from a suitable source, an electrical output signal may be generated which can be read out continuously or periodically by any suitable means.

It is to be emphasized that the output mechanism shown in FIG. 7 is illustrated for representative purposes only and does not comprise part of the present invention. It is within the skill of the art to sense the movements of arm 50 mechanically, optically, electrically or magnetically in a number of ways in order to convert the information commensurate with movements of arm 50 to output signals in suitable form for storage or use. Accordingly, it is to be understood that the present invention has been described by way of illustration and not limitation and that numerous modifications and substitutions may be made thereto without departing from the spirit and scope of the invention.

What is claimed is:

1. Apparatus for converting the motion of an input shaft to an output signal comprising:

means defining a first channel, said first channel defining means having apertures in a first wall thereof in at least two spaced locations;

a bearing element freely movable in said first channel, said bearing element having a shape commensurate with and a size smaller than said spaced apertures;

means coupled to the input shaft for imparting movement to said bearing element in said first channel from the vicinity of a first of said apertures to the vicinity of a second of said apertures;

means defining a second channel for movement of said bearing element, said second channel defining means communicating with said first channel defining means via said apertures, said bearing element passing through said second apertures and into said second channel;

impeller means mounted for movement within said second channel, said impeller means engaging and driving said bearing element from the vicinity of said second aperture to the vicinity of said first aperture, said bearing element passing through said first aperture and into said first channel; and means responsive to the driving of said bearing element by said impeller means for generating an output signal.

2. The apparatus of claim 1 wherein said channel defining means each comprise:

means defining a race for said bearing element, said races having contoured walls for directing said bearing element through said apertures in the proper direction.

3. The apparatus of claim 1 wherein said means for generating an output signal comprises:

movable cam means extending through a side wall of said second channel defining means intermediate the points of communication with said apertures whereby force will be imparted to said cam means by said impeller via said bearing element and motion thus imparted to said cam means; and means for sensing the motion of said cam means and for generating an output signal commensurate therewith.

4. The apparatus of claim 2 wherein said means for generating an output signal comprises:

movable cam means extending through a side wall of said second channel defining means intermediate the points of communication with said apertures whereby force will be imparted to said cam means by said impeller via said bearing element and motion thus imparted to said cam means; and means for sensing the motion of said cam means and for generating an output signal commensurate therewith.

5. The apparatus of claim 3 wherein said bearing element comprises:

a light weight ball.

6. The apparatus of claim 4 wherein said bearing element comprises:

a light weight ball.

7. The apparatus of claim 6 wherein said input shaft rotates and wherein said means for imparting movement to said bearing element comprises:

a rotor mounted on said input shaft, said rotor having a length commensurate with the average radius of the race comprising said first channel, said rotor further being characterized by a recess formed adjacent its outer end, said recess capturing said ball during movement thereof.

8. The apparatus of claim 4 wherein said impeller means comprises:

impeller drive motor means;

a drive shaft coupled to said motor means and extending into the bearing element race defined by said second channel defining means; and an impeller mounted on said drive shaft within said second channel defining means.

9. The apparatus of claim 7 wherein said impeller means comprises:

impeller drive motor means;

a drive shaft coupled to said motor means and extending into the bearing element race defined by said second channel defining means; and an impeller mounted on said drive shaft within said second channel defining means.

10. The apparatus of claim 9 wherein said impeller comprises:

an enlarged portion adjacent the drive shaft, said enlarged portion being of sufficient dimension to retain the bearing element juxtapositioned to the outer wall of the race defined by said second channel defining means; and at least a first split arm extending outwardly from said enlarged portion, the spacing between said split arm elements being commensurate with the width of said cam means whereby said impeller will clear said cam means when said bearing element is not being driven thereby.

11. The apparatus of claim 4 wherein said motion sensing means comprises:

register arm means;

means urging said register arm means in a first direction; and movable stop means normally preventing movement of said register arm under the influence of said urging means; and means connecting said stop means to said cam means whereby said stop means will move and release said register arm means whenever said bearing element and impeller cause motion of said cam means.

12. The apparatus of claim 9 wherein said motion sensing means comprises:

register arm means;

means urging said register arm means in a first direction; and movable stop means normally preventing movement of said register arm under the influence of said urging means; and means connecting said stop means to said cam means whereby said stop means will move and release said register arm means whenever said bearing element and impeller cause motion of said cam means.

13. The apparatus of claim 12 further comprising:

return means for said register trip arm means, said return means being driven by said impeller drive motor means and returning said trip arm means to said stop means after each release.

14. The apparatus of claim 13 wherein said return means comprises:

a projection extending from said trip arm means; and lift cam means rotating synchronously with said impeller, said lift cam engaging said projection.

15. The apparatus of claim 14 wherein said impeller comprises:

an enlarged portion adjacent the drive shaft, said enlarged portion being of sufficient dimension to retain the bearing element juxtapositioned to the outer wall of the race defined by said second channel defining means; and at least a first split arm extending outwardly from said enlarged portion, the spacing between said split arm element being commensurate with the width of said cam means whereby said impeller will clear said cam means when said bearing element is not being driven thereby.

* * * * *